United States Patent
Schroeder

(10) Patent No.: US 11,933,276 B2
(45) Date of Patent: Mar. 19, 2024

(54) ROTARY SLIDE BEARING

(71) Applicant: RHEINISCH-WESTFÄLISCHE TECHNISCHE HOCHSCHULE AACHEN, Aachen (DE)

(72) Inventor: Tim Schroeder, Aachen (DE)

(73) Assignee: RHEINISCH-WESTFAELISCHE-TECHNISCHE HOCHSCHULE, Aachen (DE)

( * ) Notice: Subject to any disclaimer, the term of this patent is extended or adjusted under 35 U.S.C. 154(b) by 1037 days.

(21) Appl. No.: 16/631,654

(22) PCT Filed: Jul. 23, 2018

(86) PCT No.: PCT/EP2018/000368
§ 371 (c)(1),
(2) Date: Jan. 16, 2020

(87) PCT Pub. No.: WO2019/020213
PCT Pub. Date: Jan. 31, 2019

(65) Prior Publication Data
US 2020/0173425 A1    Jun. 4, 2020

(30) Foreign Application Priority Data
Jul. 25, 2017   (DE) .......................... 102017006957.3

(51) Int. Cl.
*F16C 17/10* (2006.01)
*F03D 80/70* (2016.01)
*F16C 27/02* (2006.01)

(52) U.S. Cl.
CPC .............. *F03D 80/70* (2016.05); *F16C 17/10* (2013.01); *F16C 27/02* (2013.01); *F05B 2240/50* (2013.01); *F16C 2360/31* (2013.01)

(58) Field of Classification Search
CPC .......... F16C 17/03; F16C 17/10; F16C 17/26; F16C 27/02; F16C 33/26; F16C 2360/31; F03D 80/70; F05B 2240/50
See application file for complete search history.

(56) References Cited

U.S. PATENT DOCUMENTS

| | | |
|---|---|---|
| 1,805,992 A | 5/1931 | Michell |
| 4,260,205 A | 4/1981 | Spies |
| (Continued) | | |

*Primary Examiner* — Alan B Waits
(74) *Attorney, Agent, or Firm* — Andrew Wilford

(57) ABSTRACT

The invention relates to a plain bearing device, in particular for supporting a rotor hub of a wind turbine, comprising an inner ring element (1), which in particular forms a part of the rotating rotor shaft, and an outer ring element (2), which in particular forms a part of the rotor stator, wherein two plain bearings (3a, 3b) axially spaced apart are formed between the inner and outer ring elements (1, 2), the plain bearing surfaces (3c) of which plain bearings, in particular as viewed in a cross-section parallel through the axis of rotation (4), are arranged nonparallel to each other and each at an angle not equal to zero and/or not equal to 90 degrees to the axis of rotation (4), and wherein in each of the two plain bearings (3a, 3b) one of the interacting plain bearing surfaces (3c), in particular the plain bearing surface on the inner ring element (1), forms a surface that is continuous in the circumferential direction and the other of the interacting plain bearing surfaces (3c), in particular the plain bearing surface on the outer ring element (2), is formed by plain bearing pads (6) arranged adjacent to each other in the circumferential direction, characterized in that each plain bearing pad (6) is fastened to the ring element (2) in a radially and/or axially pliable manner.

15 Claims, 6 Drawing Sheets

(56) References Cited

U.S. PATENT DOCUMENTS

| | | | | |
|---|---|---|---|---|
| 4,676,668 | A | * | 6/1987 | Ide .................. F16C 17/065 384/117 |
| 5,393,145 | A | * | 2/1995 | Ide .................. F16F 15/0237 384/124 |
| 6,170,989 | B1 | * | 1/2001 | Zeidan ................ F16C 17/03 384/117 |
| 6,814,493 | B2 | | 11/2004 | Wobben |
| 9,279,413 | B2 | | 3/2016 | Ebbesen |
| 9,458,880 | B2 | | 10/2016 | Kari |
| 9,556,901 | B2 | | 1/2017 | Wheals |
| 10,072,704 | B2 | | 9/2018 | Sato |
| 2011/0057451 | A1 | | 3/2011 | Volmer |
| 2011/0233939 | A1 | * | 9/2011 | Noda .................. F16C 25/06 290/55 |
| 2011/0254281 | A1 | * | 10/2011 | Noda .................. F16C 25/04 290/55 |
| 2014/0377063 | A1 | | 12/2014 | Guerenbourg et al. |
| 2015/0017000 | A1 | * | 1/2015 | Sato ................... F16C 17/10 416/174 |
| 2021/0396216 | A1 | * | 12/2021 | Hager .................. F03D 80/70 |

\* cited by examiner

ROTARY SLIDE BEARING

CROSS REFERENCE TO RELATED APPLICATIONS

This application is the US-national stage of PCT application PCT/EP2018/000368 filed 23 Jul. 2018 and claiming the priority of German patent application 10 2017 006957.3 itself filed 25 Jul. 2017.

FIELD OF THE INVENTION

The invention relates to a slide bearing.

BACKGROUND OF THE INVENTION

A typical such bearing has an inner element and an outer element, with two axially spaced bearing halves being formed between the inner and outer element, with bearing faces of these two axially spaced bearing halves not being parallel to one another and each extending at an angle not equal to 0° and/or not equal to 90° to the rotation axis of the slide bearing, in each of the bearing halves one of the respective bearing faces, in particular of the inner element being formed as an annularly continuous surface and the other bearing face, in particular that of the outer element being formed by bearing pads that are angularly next to one another.

The axial spacing of the two bearing halves is understood to mean that they are spaced apart from one another in the direction of the rotation axis, the two elements each extending annularly around this rotation axis.

The formation of the bearing faces so as to not be parallel to one another and to be at an angle not equal to 0° and/or not equal to 90° to the rotation axis is preferably understood to mean that these orientations are present when the slide-bearing assembly is viewed in a section parallel through the rotation axis, that is, on a section plane that includes the rotation axis itself. This cited orientation preferably applies to every possible plane parallel through the rotation axis, which implicitly means that the bearing faces of the two axially spaced bearing halves are substantially frustoconical.

The bearing face that forms a surface that is continuous angularly forms a frustoconical portion, and the bearing face that is formed by an annulus of angularly adjacent bearing pads that are arranged next to one another forms a frustoconical surface of segments formed by the pads. The bearing face of each pad thus corresponds to a surface segment of part of frustocone.

The frustoconical bearing faces of the two axially spaced bearing halves preferably point toward one another with their tapering portions.

A slide bearing of the type described above is known, for example, from WO 2011/127510 (U.S. Pat. No. 9,458,880). The slide bearing described in that document is also provided for mounting a rotor hub of a wind turbine generator, which is also the preferred application of the invention. In principle, however, the invention is not restricted to this application, but rather can also be used for rotatably mounting other rotary elements.

The prior art referred to here provides for the arrangement of the bearing pads over the entire surface of the outer element, direct contact being provided between the rear bearing pad surface and a surface of the outer bearing element. The bearing pads are secured to the outer element by a screw that is screwed in the radial direction to the outer element and the washers used therewith to form an inherently rigid overall unit therewith. One of the advantages described here is that the bearing pads can be replaced if worn. With a slide-bearing assembly of this type with the bearing faces of the two axially spaced bearing halves at an angle to one another, the rotary element, such as the rotor hub, for example, is fixed locally both in the radial direction and in the axial direction. The angle that the bearing faces form in the above-described sectional view with the rotation axis is preferably in the range from 30° to 75°, more preferably in the range from 35 to 55°.

It has struck the applicant as problematic that when the rotor hub is loaded, for example by the weight force of the rotor, but also when wind loads occur, the rotation axis of the rotor hub tilts relative to the intended rotation axis in which the outer element is oriented. As a result of this tilting, surface contact between the bearing faces is reduced in both bearing halves, and loads are restricted to a merely linear portion between the bearing surfaces involved, whereby wear on the bearing surfaces can be significantly increased.

OBJECT OF THE INVENTION

Against this background, it is an object of the invention to achieve maximally large-surface contact between the bearing faces of the two axially spaced bearing halves under the influence of a load.

SUMMARY OF THE INVENTION

According to the invention, this is achieved in that a respective bearing pad is attached to the outer bearing element in a radially and/or axially resilient manner.

It is therefore the essential core idea of the invention that, unlike in the prior art, in which the respective bearing pads are rigidly screwed to the outer bearing element to form a direct contact between these two elements, a respective bearing pad is now flexibly attached according to the invention, which means that a bearing pad can move relative to the outer bearing element. This can be achieved by virtue of the fact that the back of the bearing pad has no direct rigid contact with the outer bearing element. The invention can provide for a bearing pad to be attached indirectly to the outer bearing element using a mounting bracket.

Indirect attachment is preferably understood to mean that the fastened bearing pad and the element to which it is fastened do not have any direct contact with one another, but rather the fastening takes place with the aid of the fastening bracket, so that it provides the resilience of the bearing pad relative to the outer bearing element.

In an especially preferred embodiment, a mounting bracket that is used can be resiliently elastic, for example through the use of a spring steel to form such a mounting bracket.

In the invention, preferably in each of the two axially spaced bearing halves, the bearing face that is continuous angularly is formed on the inner element and the bearing face that is segmental and formed by a plurality of bearing pads is arranged on the outer element. In principle, however, this design can also be reversed.

In a preferred embodiment, according to the invention the mounting bracket is arranged between the outer bearing element and each of its bearing pads, the mounting bracket forming a flexure support enabling the respective bearing pad to move relative to the outer bearing element.

Such a flexure hinge can be formed as a result of the fact that it includes a portion of reduced flexural rigidity in comparison to two adjoining portions of greater flexural rigidity. For example, the portion of reduced flexural rigidity can be created by reducing the cross section in comparison to the adjoining portions. The formation of a flexure hinge is not limited to this design, however. A flexure hinge can also be produced with or without a reduction in cross section in the connecting portion of two legs standing at an angle not equal to °. With reference to the above-described preferred embodiment, that this mounting bracket is preferably on the outer element.

According to the invention the bearing pad can be moved by the mounting bracket about at least one axis relative to the outer bearing element to which the mounting bracket is attached. In an especially preferred embodiment, this axis is perpendicular to the rotation axis. By virtue of the mobility around such an axis, the bearing pad, which, in turn, is attached to the mounting bracket, is simultaneously attached to the outer bearing element in both a radially and axially resilient manner, since movement about this axis manifests itself in a change both in the axial and in the radial position of the attached bearing pad.

The invention ensures that, when loads occur that result in a tilting of the axis of the rotor hub of a wind turbine generator to the desired rotation axis, which is defined by the orientation of the outer element, the individual respectively resiliently mounted bearing pads are able to adapt to the tilted rotation axis, so that considerable surface contact between the bearing faces involved is maintained without the line contact between the bearing faces that is susceptible to wear.

Since the bearing pads in the prior art rest with their entire surfaces against a solid, rigid portion of the outer bearing element, those bearing pads are also rigidly fixed in position. In the case of the invention, however, the mounting brackets can ensure that the outer face of the bearing pad is not supported on the outer bearing element by contact. Instead, the construction is preferably such that the outer face of the bearing pad and the part of the mounting bracket to which it is fastened rests clear of the outer bearing element, meaning that it is contactless. According to the invention a mounting bracket is formed by a leg that extends away from the outer bearing element in the axial direction at an angle not equal to 0° relative to the rotation axis, with the leg carrying the bearing pad on its side facing the rotation axis, the leg being particularly attached to the outer bearing element or integrally formed therewith.

The angle to the rotation axis preferably corresponds to the above-described 30 to 75°, more preferably 35 to 55°.

Accordingly, according to the invention each mounting bracket is a part that is separate from the outer bearing element that is, in turn, attached to the outer bearing element or forms an integral part of the outer bearing element. It is preferred if the mounting bracket is embodied as a separate part.

In accordance with the invention all of the bearing pads of a slide bearing are fastened to the respective element, particularly to the outer element, by a common mounting bracket. For this purpose such a common mounting bracket can have a part that for example can be attached to the outer bearing element and has legs that project oppositely in the axial direction and radially outward, it being possible for a bearing pad to be fastened to each such leg.

In a preferred embodiment, however, according to the invention either each bearing pad of each of the two axially spaced bearing halves is attached to the outer bearing element by its own mounting bracket, or alternatively that two bearing pads that are arranged at the same circumferential position and spaced apart in the axial direction are attached to a common fastening element. Accordingly, such a mounting bracket according to the invention carries exactly one bearing pad in the first embodiment and exactly two bearing pads in the other embodiment, particularly on opposite sides of the mounting bracket. In general, the invention can provide in a preferred constructive embodiment that each mounting bracket has a first part or leg that attaches it to the outer bearing element and has at least one second, particularly axially widening leg that extends from the first part at an angle not equal to 0° and to which a respective bearing pad is attached. The direction of extension of the legs is therefore different.

The angle is preferably selected such that, when the first bracket part is attached to the outer bearing element, the at least one above-described second leg assumes the preferred angle of to 75°, more preferably 35 to 55°, to the rotation axis. The provision of the two legs at an angle to one another already ensures that this angular transitional portion acts like a flexure hinge between the two legs, so that the two legs can be moved in a resiliently elastic manner relative to one another, particularly as part of a resiliently elastic material formation. Accordingly, if the leg provided for attachment to the outer bearing element is rigidly connected to the outer bearing element, resilience is achieved in that the leg to which a bearing pad is connected can move resiliently relative to the outer bearing element while deforming elastically. The resilience is preferably such that, starting from an unloaded desired position, a leg carrying a respective bearing pad can move both clockwise and counterclockwise about the possible axis of resilience. The resilience is therefore possible in both directions starting from the unloaded target position.

Each mounting bracket can be attached to the outer element in any possible manner. For example, the above-described first bracket part that is provided for this purpose can be attached to the outer bearing element by screwing or riveting. An integral connection can also be provided, for example by welding this leg to the outer bearing element. A mounting bracket can also be integrally formed with the outer bearing element. In that case, this first bracket part is not recognizable as a separate element, but rather only the leg that is provided for fastening the bearing pad. This embodiment then corresponds to the one-piece embodiment described above. In this one-piece design, the mounting bracket thus forms a leg that projects from the outer bearing element in the axial direction at an angle to the rotation axis. The angle is the non-zero degree angle mentioned at the outset, which defines the frustoconical bearing face.

Regardless of the manner of attachment of the mounting bracket to the outer bearing element, the leg of a mounting bracket provided for attaching a bearing pad is preferably free of contact with the outer bearing element on its outer face facing away from the bearing pad. Clearance is thus provided between this back side of the leg and the outer bearing element.

In the embodiment in which the mounting bracket carries only a single bearing pad, each mounting bracket can have a first bracket part that attaches it to the outer bearing element and a single second leg that extends from the first bracket part at an angle, preferably an acute angle, and to which a bearing pad is attached, the leg that is attached to the outer bearing element being attached to an axial end face of the outer bearing element.

In this embodiment, the preferably outer element thus has a number of mounting brackets on each of the two oppositely axial end faces, with the mounting brackets on one axial end face being associated with one of the two axially spaced bearing halves, and with the mounting brackets on the other axial end face being associated with the other of the two axially spaced bearing halves.

This opens up the special advantage that the fastening portions of the mounting brackets on the axial end faces of the outer bearing element are also accessible when a wind turbine generator is in operation, so that maintenance work such as the replacement of worn bearing pads, for example, can be performed with particular ease.

In the other preferred embodiment, according to the invention each mounting bracket has a first bracket part that secures it to the outer bearing element and two second legs situated opposite one another on both sides of the first bracket part, each of which extends from the first bracket part at an angle and to each of which a bearing pad is attached, the leg attached to the outer bearing element being attached to a radial inner surface of the outer bearing element.

The portion of reduced flexural rigidity in all embodiments is preferably in the area of the transition between the first and second leg where they meet at an angle. This portion can be additionally provided with a smaller cross section than the adjacent legs. However, this is not absolutely necessary for the creation of an elastic mobility between the legs.

In one possible embodiment, according to the invention, in the above-described embodiment but also in other embodiments of the mounting brackets that are not described, a bearing pad rests with its outer face facing away from the respective bearing face against the entire surface of the leg of the mounting bracket that is provided for this purpose.

In this embodiment, mobility of the bearing pad is defined substantially by the mobility between the two legs of a mounting bracket that merge into one another at an angle. As mentioned at the outset, this mobility is essentially mobility about a single axis that is preferably oriented perpendicular to the rotation axis. This essentially has the effect that there is maximum mobility of the bearing pad primarily in the vicinity of the bearing pad lying axially to the outside relative to the outer bearing element. One embodiment that is preferred over this is that a respective bearing pad is partially recessed on the side facing away from the bearing face, i.e. on its outer face facing toward the mounting bracket, and hence on its leg that is provided for the attachment of the bearing pad.

This ensures that a bearing pad that is attached to the mounting bracket can not only move together with the leg of the mounting bracket relative to the outer bearing element, but an attached bearing pad can also move relative to the leg of the mounting bracket, since an attached bearing pad can also enter the space of the mounting bracket or the leg in which it is arranged with clearance.

Here, according to the invention the bearing pad is fastened over its entire surface to the leg of the mounting bracket in a first portion of its rear surface and mounted in a contactless manner with respect to the leg on a second portion of its rear surface. This can be achieved, for example, in that the leg of the mounting bracket is of reduced thickness in its portion opposite the second portion compared to its thickness in the first portion, the two cited portions especially preferably meet at a step whose edge adjoining the first portion extends perpendicular to the rotation axis.

An attached bearing pad can thus be pivoted both about a first flexure hinge axis that lies near the outer bearing element due to its arrangement in the transitional portion of the two legs and a second axis that is farther from the outer bearing element due to its location at the step between the two portions, which can result in improved adaptation of the bearing face of such bearing pad to the oppositely situated, particularly inner bearing face that is arranged so as to be tilted in the rotation axis. Preferred here are the two axes about which a bearing pad can be resiliently moved parallel to one another and thus perpendicular to the rotation axis.

In a preferred embodiment the first portion is at the axially outer end of the mounting bracket in order to achieve spacing between the two resilient portions.

More preferably, the first portion has a smaller surface area than the second portion, so the portion of resilience that is spaced from the outer bearing element can be displaced axially farther outward.

One development of all possible embodiments can also be that the legs carrying the bearing pads of two mounting brackets of a respective slide bearing that are aligned with one another angularly are connected, particularly releasably connected, to one another, hence particularly angularly and preferably in an axially outer and/or inner portion. This ensures that a load acting on one leg of a mounting bracket that results in a change in the position of the bearing pad is also transferred through the connection to adjoining legs and bearing pads thereof, resulting in a coupling of the legs and bearing pads.

According to the invention, bearing pads that adjoin one another angularly have a particularly releasable connection to one another in this circumferential direction, particularly at their axially outer end portions or at their axially inner end portions, particularly in the location where they have clearance with respect to the leg of the mounting bracket.

In both of the above-described embodiments, such a connection can be established by means of a connecting web that is connected on both sides to the respective one of the adjoining legs or pads, for example by screwing.

BRIEF DESCRIPTION OF THE DRAWING

The preferred embodiments will be described in greater detail with reference to the figures in which.

SPECIFIC DESCRIPTION OF THE INVENTION

Figure 1:
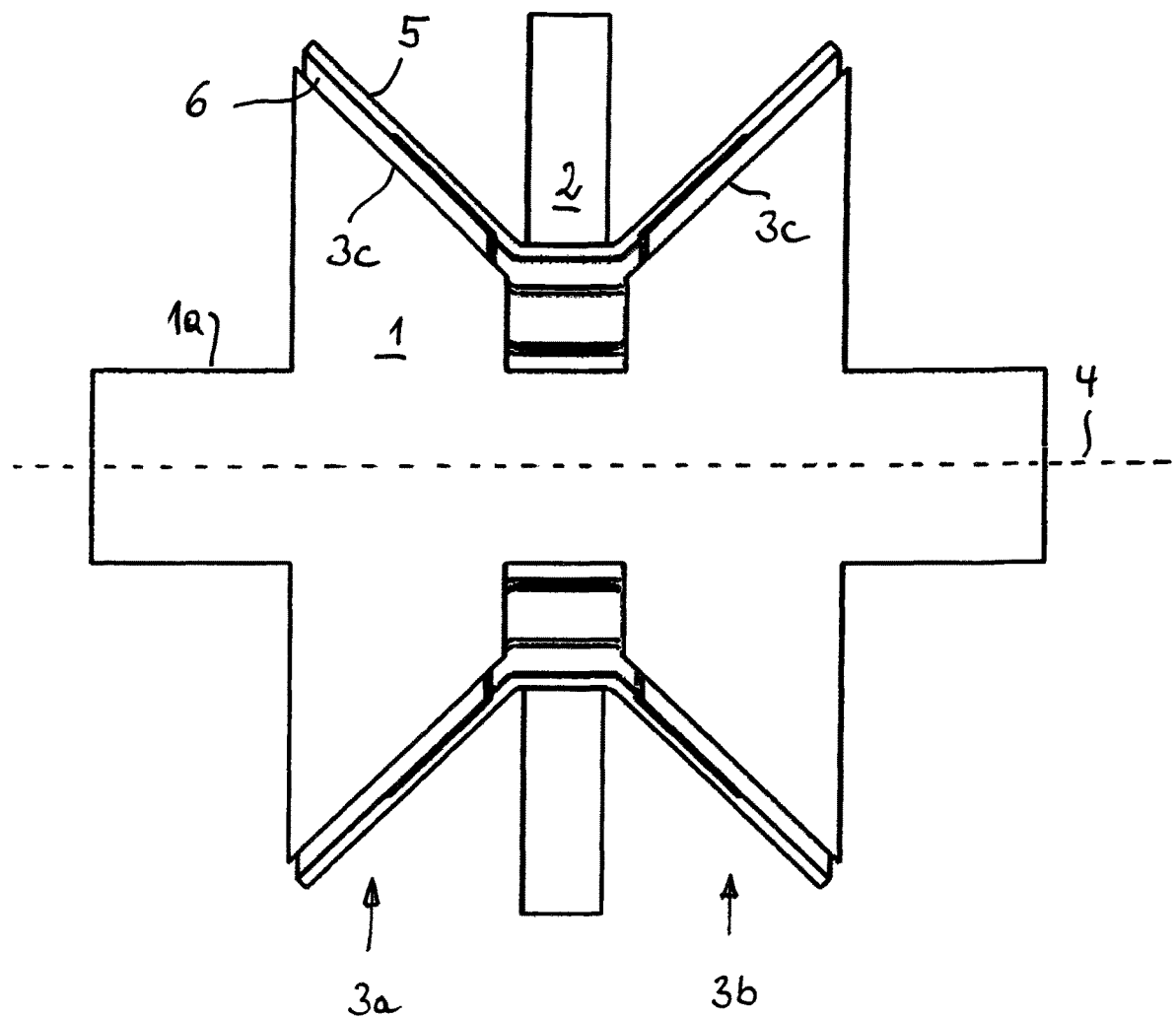
FIG. 1 is an axial section through a wind-turbine rotor hub according to the invention.

FIG. 1 shows a slide-bearing assembly of the invention in a sectional view in which the section plane, here the drawing plane, is parallel to a rotation axis 4 and actually includes the rotation axis 4.

An inner element 1 and an outer element 2 are shown here, the inner element 1 forming part of the rotating rotor hub of a wind turbine generator. Rotation occurs around the center axis of the shaft 1a, which corresponds to the rotation axis 4.

With respect to the view shown here, this slide-bearing assembly has a first bearing half 3a, which in the view lies axially to the left of the annular outer part 2 and a second bearing half 3b, which in the view lies axially to the right of the outer element 2. These two bearing halves 3a and 3b are thus spaced apart axially in the direction of the rotation axis 4.

For each of the axially spaced bearing halves 3a and 3b, the inner element 1 has a frustoconical bearing surface 3c that is angularly continuous. The frustoconical bearing surfaces 3c point toward one another with their tapered ends.

In contrast, separate bearing pads 6 are mounted angularly next to one another on the outer element 2 on respective mounting brackets 5. Each bearing pad 6 forms a portion of the surface of a frustocone with its bearing face. Due to the frustoconical arrangement, the bearing assembly restrains the position of the hub axially and radially.

Figure 2:
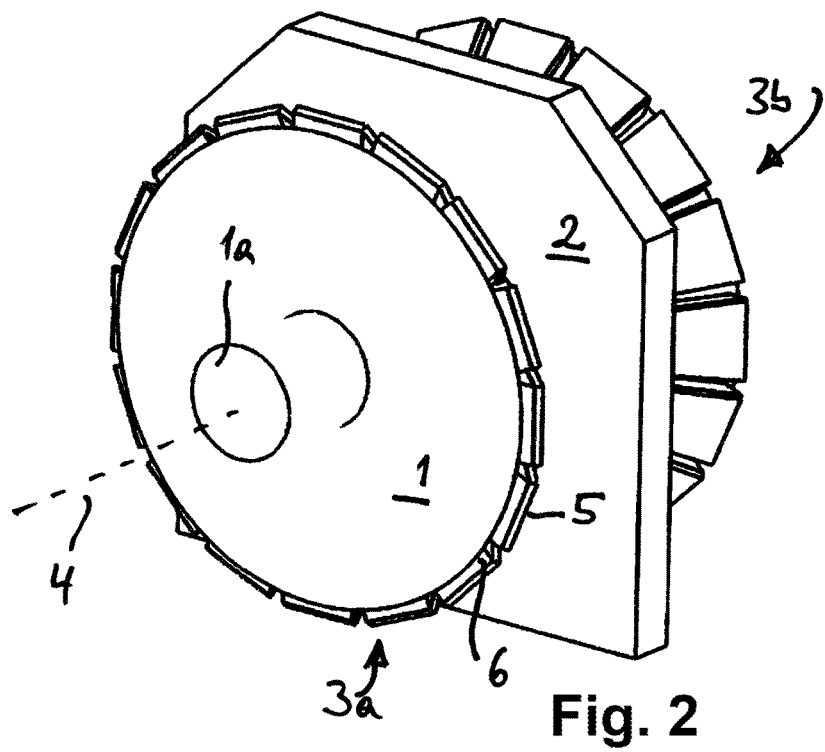
FIG. 2 is a perspective view of the hub of FIG. 1.

FIG. 2 shows the same arrangement in a perspective view.

Figure 3:
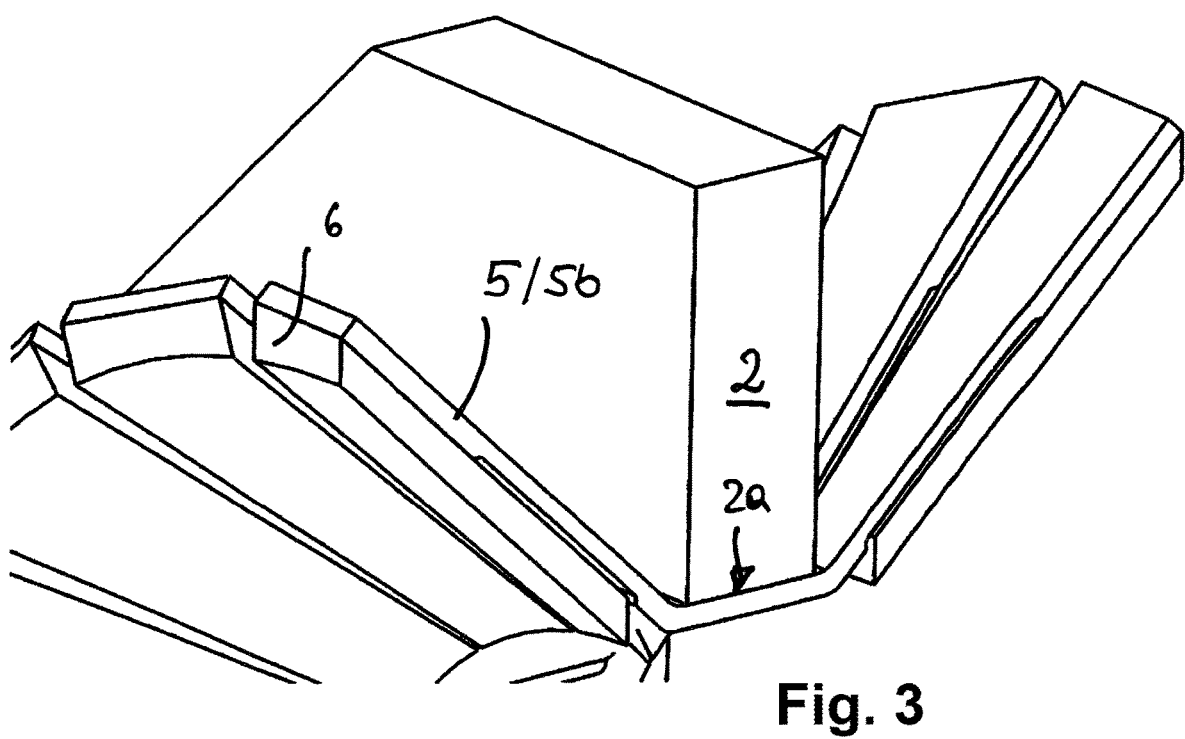
FIG. 3 is a large-scale view of a detail of the hub of FIGS. 1 and 2.

FIG. 3 shows a detail of a perspective view of only the outer element 2 with several mounting brackets 5 fastened thereto, each carrying a respective bearing pad 6. According to FIG. 4, which shows the mounting bracket 5 according to the invention, which is separate from the annular outer part 2 and has bearing pads arranged thereon, it can be seen that each mounting bracket 5 has a first part 5a that is in the middle of the mounting bracket 5 and two legs 5b projecting therefrom on both sides, each of which extends the first center part 5a at an angle, particularly at the same angle α. The center part 5a is used to attach the mounting bracket 5 to a surface of the radial inner element 2 (FIG. 3). Here, the center part 5a is attached substantially over its entire surface to the outer bearing element surface 2a, for example by screwing, so that this connection is rigid.

Due to their elasticity in the corner between the parts 5a and 5b, the legs 5b that carry the bearing pads 6 are resiliently movable compared to the rigid connection of the center part 5a to the annular outer part 2, so the two parts 5a and 5b can essentially move in the vicinity of this transition relative to one another about respective axes 5c. In contrast to the prior art, the bearing pad 6 is not fixed relative to the annular outer part 2 but is resiliently movable relative thereto.

FIG. 3 shows an open space between the leg 5b and the annular outer part 2, so that the outer face of the bearing pad 6 being held is not engageable with the rigid annular outer part 2.

Figure 4:
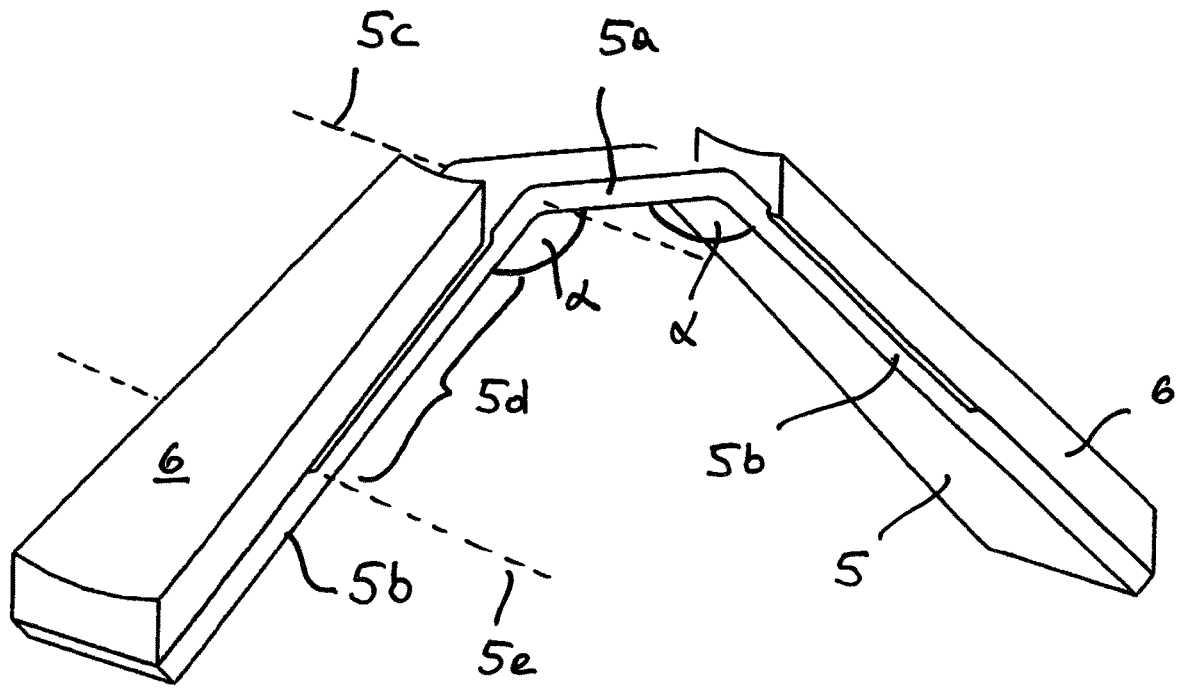
FIGS. 4 and 5 are perspective views of two brackets according to the invention.

FIG. 4 in particular further illustrates that the outer face of each bearing pad 6 is in surface contact with the leg 5b only in an axially outer portion of the respective leg 5b, meaning that here there is flat surface contact between the outer face and the leg 5b, whereas the outer face of the bearing pad 6 does not normally engage the leg 5b in the inner portion 5d, particularly is spaced therefrom. This is achieved here through a reduction in the material thickness of the leg 5b in the portion 5d compared to the outer portion where there is full-surface contact.

Figure 5:
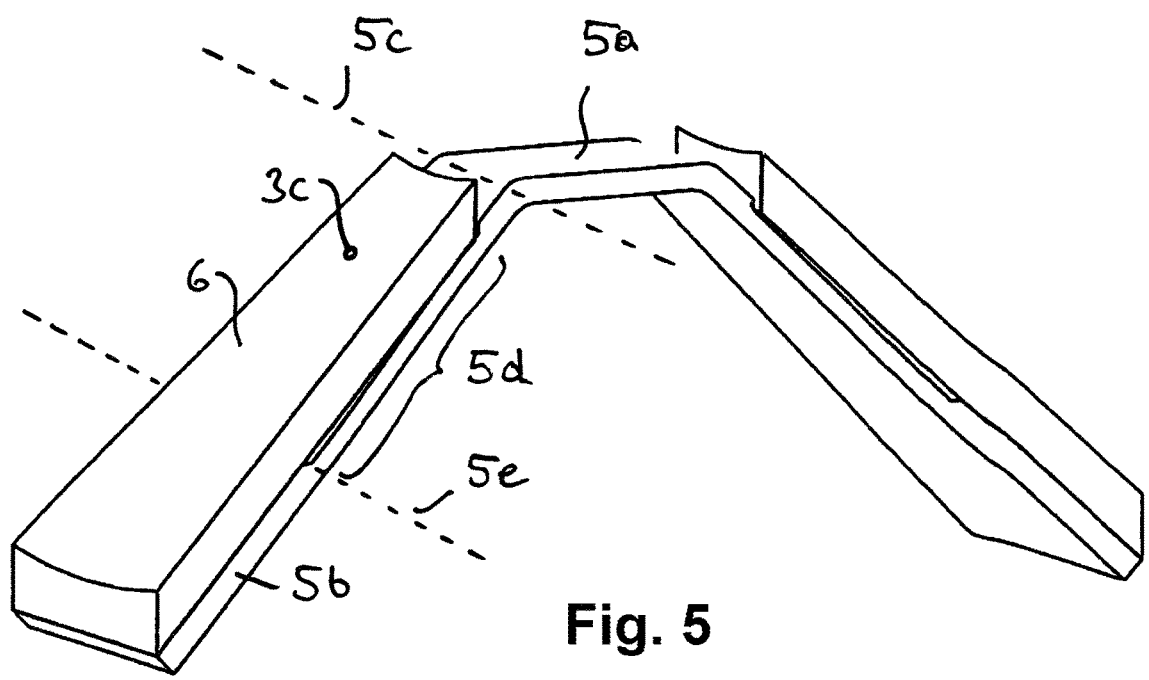

FIG. 5 illustrates that, under an assumed load on the shaft and an elastic rotational mobility about the additional axis at the stepped transition between the two portions, the axially inner end of a bearing pad 6 can move into the space of the thinning in the material of the portion 5d. Accordingly, a bearing pad 6 can be moved both together with the leg 5b relative to the center part 5a that is rigidly connected to the annular outer part 2a and also about the axis 5e relative to the leg 5b.

Figure 6:
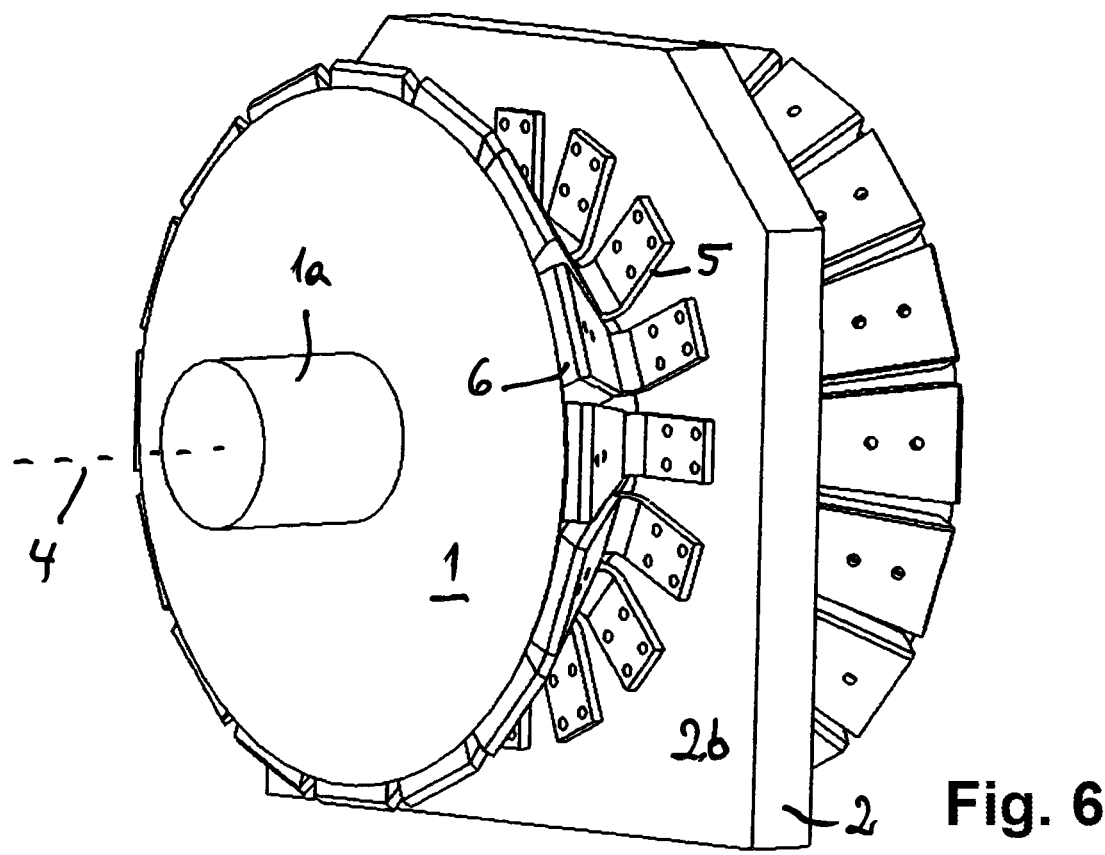
FIG. 6 is a perspective view like FIG. 2 of another hub in accordance with the invention.
Figure 7:
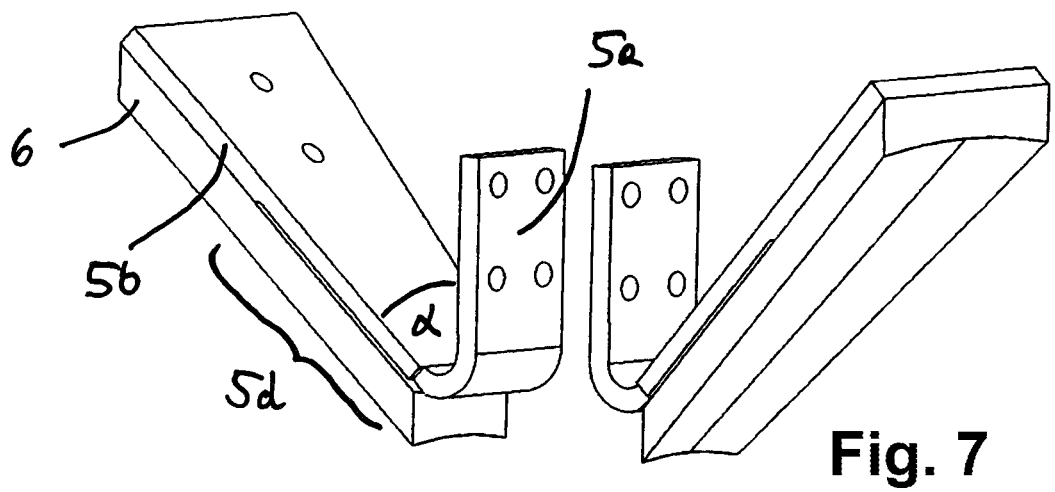
FIG. 7 is a large-scale view of a detail of the hub of FIG. 6.

FIG. 6 shows another preferred embodiment of the invention, in which each individual bearing pad 6 is associated with its own mounting bracket 5. According to FIG. 7, just as in the embodiment of the above-described figures, each mounting bracket 5 has a center part 5a with which the mounting bracket 5 is attached to the annular outer part 2, but here to an axial end face 2b thereof, securing this center part 5a on only one side thereof with the respective leg 5b at an angle α, particularly at an acute angle.

Accordingly, a mounting bracket 5 of this embodiment carries only a single bearing pad 6.

Here as well, due to the elasticity of the material of the mounting bracket 5, the leg 5b can move elastically relative to the center part 5a, this embodiment also implementing the advantageous construction in which the bearing pad 6 is mounted with clearance in the portion 5d that is closer to the center part 5a, meaning that it is contactless with respect to the leg 5b, thus enabling the axial inner end of the bearing pad 6 to move into this space, just as in the previously mentioned embodiment.

This embodiment also results in a resilient supporting of the bearing pad 6 about two substantially parallel axes, so that when a load is applied, the bearing pad 6 is able to adapt to the changed axis geometry of the rotor hub both in the first and in the second embodiment. In this way, a maximally large surface contact between the oppositely situated bearing faces is achieved and line contact is avoided.

Figure 8:
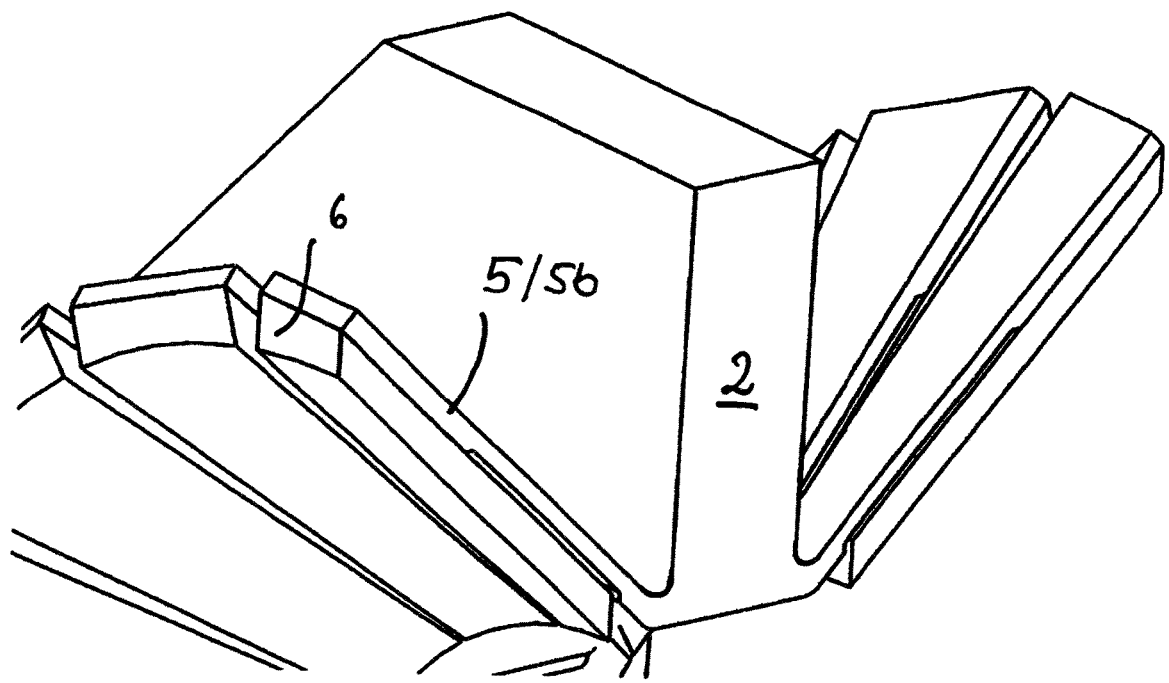
FIGS. 8 and 9 are views like FIG. 8 of variants of the invention.

FIG. 8 illustrates a slight modification of the embodiment according to FIG. 3, in which the mounting bracket 5 or leg 5b thereof carrying the bearing pad is not a separate part to be attached to the annular outer part 2, but rather the leg 5b is unitarily formed with the annular outer part 2. The design with a portion that is hollow is also implemented here.

Figure 9:
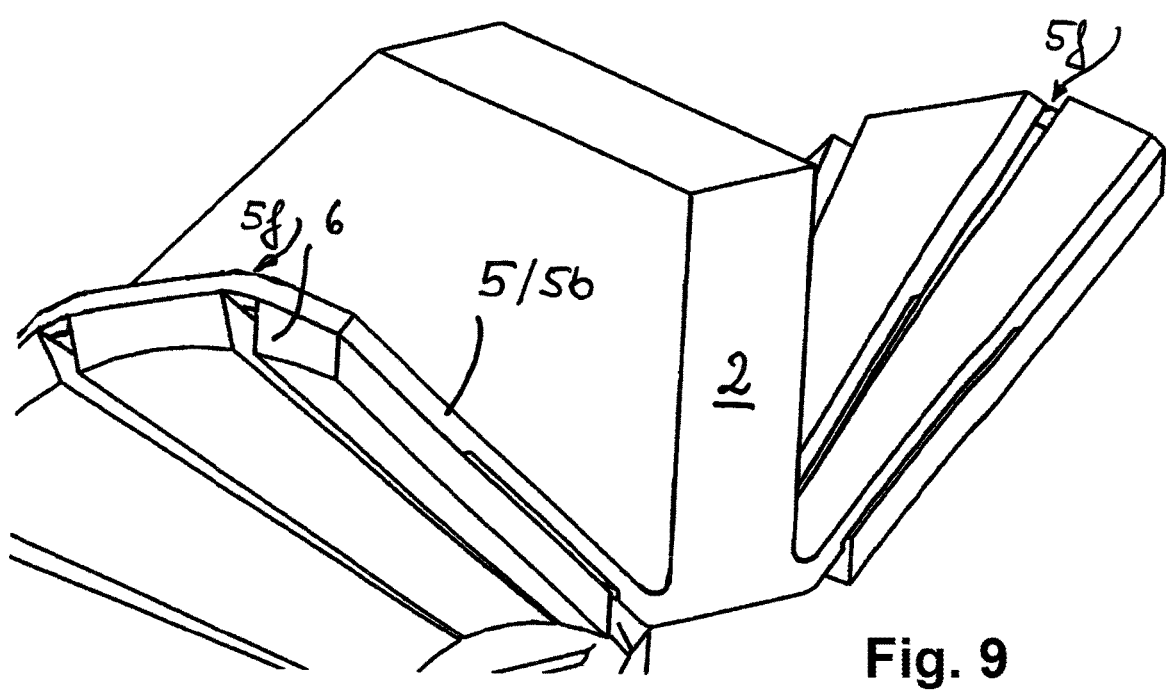

FIG. 9 shows another modification of the embodiment according to FIG. 8, which is also applicable to the embodiments of FIGS. 3 and 6. Here, the legs 5b of circumferentially adjoining bearing pads 6 are connected to one another axially at their outer ends by connecting webs 5f. A load on one leg 5b is also transferred directly to an adjacent leg 5b by virtue of this coupling.

The embodiment has the effect that the coupled legs 5b of all of the mounting brackets 5 form a frustoconical ring having axially extending slots that are spaced angularly apart. A slot thus extends from the portion of the connection of each leg 5b to the outer bearing element (regardless of whether it is in one piece or fastened) to the connecting web 5f lying axially on the outside. The leg 5b that carries a respective bearing pad 6 is formed between two adjacent slots.

Figure 10:
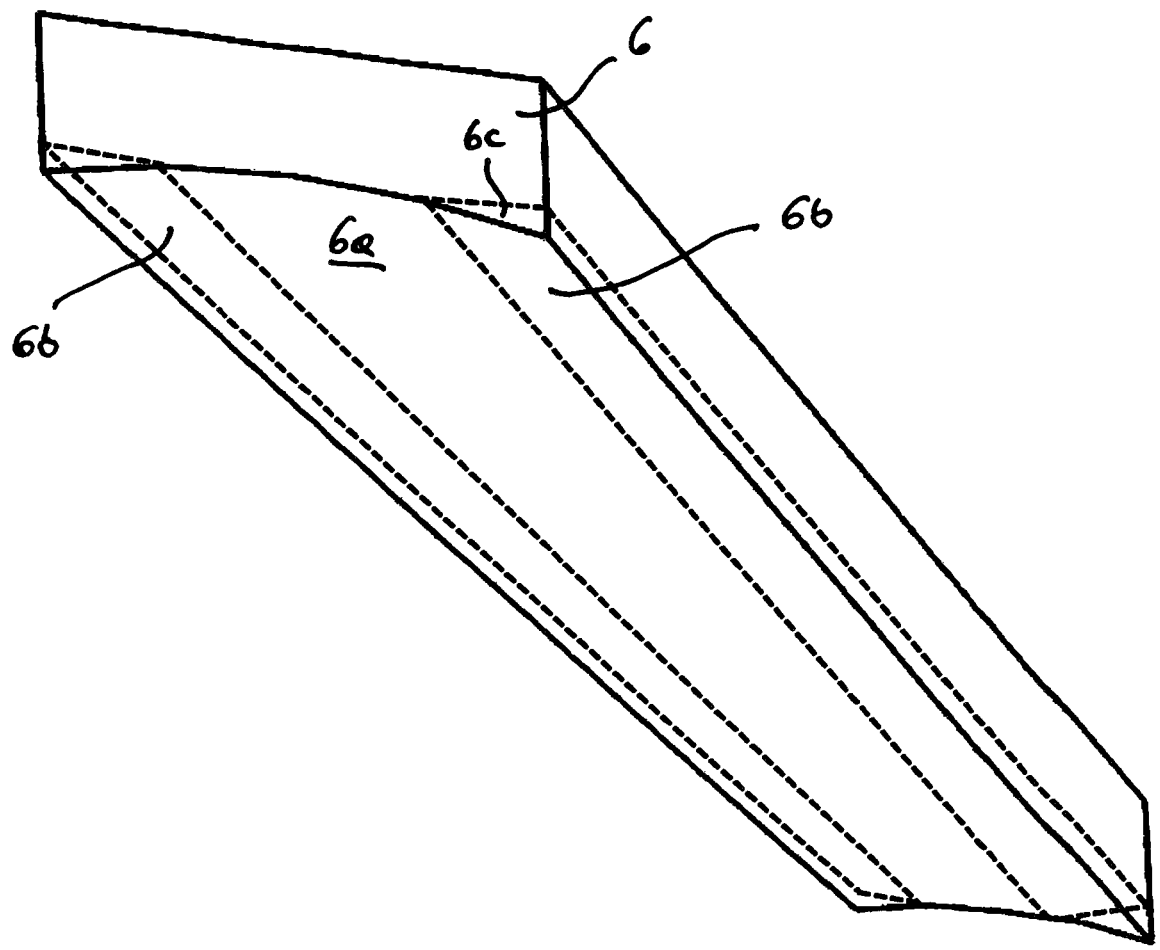
FIG. 10 is view of another bearing pad according to the invention.

FIG. 10 illustrates a single bearing pad 6 such as can be configured according to the solid lines in one possible embodiment and thus essentially represents a segment of a cone with its bearing face 6a.

According to another preferred embodiment, the portions 6b that are framed by dashed lines can be designed so as to deviate from a frustoconical surface profile, that is, so as to remain behind same, it being possible for the invention to provide for such an embodiment at only one of the two edges, or, as shown here, at both edges. In this way, inlet cones 6c are formed in terms of their shape that are intended to draw oil into the slide bearing between the oppositely situated bearing faces.

The invention claimed is:

1. A slide bearing for rotationally supporting a rotor hub of a wind turbine generator, the slide bearing comprising:
    an inner element forming part of a rotating rotor shaft rotatable about an axis,
    an outer element forming part of a rotor stator,
    two axially spaced bearing halves between the inner and outer elements having respective bearing faces as viewed in a section parallel through the axis that are not parallel to one another and each extend at an angle not equal to 0° and/or not equal to 90° to the axis, in each of the bearing halves one of the respective bearing faces of the respective inner element being formed as an annularly continuous surface and the other bearing face of the respective outer element being formed by an annular array of bearing pads angularly next to one another, and
    a respective elastically deformable mounting bracket attaching each bearing pad in a radially or axially resilient manner to the outer element.

2. The slide bearing according to claim 1, wherein each mounting bracket extends between the outer element and the respective bearing pad, the brackets each including a flexure hinge configured to enable movement of the respective bearing pad relative to the outer element about at least one axis.

3. The slide bearing according to claim 1, wherein each mounting bracket is formed with a leg that extends axially away from the respective outer element at an angle not equal to 0° relative to the axis, with the leg carrying the bearing pad on its side facing the axis, the legs each being attached to the respective outer element or integrally formed therewith.

4. The slide bearing according to claim 1, wherein each bearing pad of each of the two bearing halves is attached to the respective outer element by its own mounting bracket.

5. The slide bearing according to claim 4, wherein each mounting bracket has a first bracket part that attaches it to the outer element and a single second leg that extends from the first bracket part at an acute angle and to which a respective one of the bearing pads is attached, with the part attached to the outer element being attached to an axial end face of the outer element.

6. The slide bearing according to claim 5, wherein the bearing pads are each fastened in surface contact to the respective leg of the mounting bracket in a first portion of its rear surface and in a contactless manner with respect to the respective leg in a second portion of its rear surface.

7. The slide bearing according to claim 4, wherein each mounting bracket has a first bracket part that attaches it to the outer bearing element and two second legs situated opposite one another on both sides of the first bracket part, each of which extends from the first bracket part at an angle and to each of which a respective one of the bearing pads is attached, with the leg that is attached to the outer element being attached to a radial inner surface of the outer element.

8. The slide bearing according to claim 7, wherein the leg of the mounting bracket has a reduction in thickness in its portion opposite the second portion of the rear surface of the bearing pad compared to thickness in the first portion, the two portions adjoining one another at a step whose edge adjoining the first portion extends perpendicular to the axis.

9. The slide bearing according to claim 7, wherein the first portion has a smaller surface area than the second portion.

10. The slide bearing according to claim 4, wherein each bearing pad rests partially clear of the respective mounting bracket on a side facing away from the bearing face.

11. The slide bearing according to claim 10, wherein the first portion is on an axially outer end of the mounting bracket.

12. The slide bearing according to claim 1, wherein two of the bearing pads of the two bearing halves that are at the same circumferential position and spaced apart in the axial direction are attached to a common mounting bracket.

13. The slide bearing according to claim 1, wherein each mounting bracket has a first bracket part that attaches it to the outer element and has at least one second axially widening leg that extends from the first bracket part at an angle not equal to 0° and to which a respective one of the bearing pads is attached.

14. The slide bearing according to claim 4, wherein the legs carrying the bearing pads of two mounting brackets angularly adjacent one another are angularly releasably connected 7 to one another in an axially outer portion.

15. A slide bearing for use between a stator through which extends a rotor formed with a pair of frustoconical bearing faces centered on a rotation axis of the rotor, the slide bearing comprising:
    two annular arrays of elastically deformable mounting brackets fixed to the stator around the rotor and having legs angularly adjacent one another in a frustoconical array and having faces confronting the respective bearing faces of the rotor, and
    respective slide-bearing pads fixed to the legs of the rotor and bearing elastically on the respective bearing faces, whereby tilting of the rotation axis in the stator elastically deforms some of the legs with the bearing pads remaining in surface contact with the respective bearing faces.

* * * * *